(12) United States Patent
Peters

(10) Patent No.: US 6,991,295 B2
(45) Date of Patent: Jan. 31, 2006

(54) FITTING FOR A VEHICLE SEAT

(75) Inventor: Christoph Peters, Wermelskirchen (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/039,581

(22) Filed: Jan. 19, 2005

(65) Prior Publication Data

US 2005/0127732 A1    Jun. 16, 2005

Related U.S. Application Data

(63) Continuation of application No. PCT/EP03/011780, filed on Oct. 24, 2003.

(30) Foreign Application Priority Data

Nov. 14, 2002 (DE) ............................. 102 53 054

(51) Int. Cl.
*B60N 2/20* (2006.01)

(52) U.S. Cl. ...................................... 297/367
(58) Field of Classification Search ............... 297/367, 297/378.12
See application file for complete search history.

(56) References Cited

U.S. PATENT DOCUMENTS

| | | | |
|---|---|---|---|
| 4,103,970 A * | 8/1978 | Homier ..................... 297/363 |
| 4,770,464 A * | 9/1988 | Pipon et al. ................ 297/367 |
| 5,632,525 A * | 5/1997 | Uramichi .................... 297/367 |
| 5,681,086 A | 10/1997 | Baloche |
| 5,685,611 A | 11/1997 | Eguchi et al. |
| 5,749,624 A | 5/1998 | Yoshida |
| 5,785,386 A | 7/1998 | Yoshida |
| 5,873,630 A | 2/1999 | Yoshida et al. |
| 6,007,152 A | 12/1999 | Kojima et al. |
| 6,023,994 A * | 2/2000 | Yoshida ..................... 297/367 |
| 6,024,410 A | 2/2000 | Yoshida |
| 6,142,569 A * | 11/2000 | Kidokoro et al. ........... 297/366 |
| 6,220,666 B1 * | 4/2001 | Ohya ........................ 297/367 |
| 6,328,383 B2 * | 12/2001 | Rohee et al. ............... 297/367 |
| 6,454,354 B1 | 9/2002 | Vossmann et al. |
| 6,749,263 B2 | 6/2004 | Peters |

FOREIGN PATENT DOCUMENTS

| | | |
|---|---|---|
| DE | 101 02 860 A1 | 8/2002 |
| EP | 0 720 930 A1 | 7/1996 |

(Continued)

*Primary Examiner*—Peter R. Brown
(74) *Attorney, Agent, or Firm*—Womble Carlyle Sandridge & Rice PLLC

(57) ABSTRACT

A fitting for a vehicle seat, having a first fitting part (11), and a second fitting part (12) which is rotatable and lockable relative to the first fitting part (11). At least one locking element (19) is arranged for movement in a radial direction, with its opposite longitudinal sides (22) being guided along guide surfaces (17) on the first fitting part (11), and the locking element includes at least one tooth (21) which cooperates, on its radially outer side, with toothing (14) on the second fitting part (12) for the purposes of locking. Each of the longitudinal sides (22) has at least one step (41) dividing the respective longitudinal side (22) into a first section (43) and an adjacent second section (45) which extends between the step (41) and the tooth (21), and the second section (45) is set back relative to the first section (43) with respect to the associated guide surface (17) to permit the locking member to tilt when the second fitting part is impacted.

21 Claims, 3 Drawing Sheets

FOREIGN PATENT DOCUMENTS

| | | |
|---|---|---|
| EP | 0 749 865 A2 | 12/1996 |
| EP | 0 773 133 A2 | 5/1997 |
| EP | 0 967 110 A2 | 12/1999 |
| EP | 0 967 111 A2 | 12/1999 |
| EP | 1 195 115 A | 4/2002 |
| EP | 1 195 115 A1 | 4/2002 |
| WO | WO 00/44582 A1 | 8/2000 |
| WO | WO 00/76374 A1 | 12/2000 |

\* cited by examiner

FITTING FOR A VEHICLE SEAT

CROSS REFERENCE TO RELATED APPLICATION

The present application is a continuation of International Application PCT/EP2003/011780, filed Oct. 24, 2003, and which designates the U.S. The disclosure of the referenced application is incorporated herein by reference.

BACKGROUND OF THE INVENTION

The present invention relates to a fitting for a vehicle seat, in particular a detent fitting for an automobile seat, which allows for the adjustment of the inclination of the backrest of the seat.

A fitting of this general type is known from EP 0 720 930 B1, and corresponding U.S. Pat. No. 5,681,086. In the fitting disclosed in these documents, three locking elements are provided, near their teeth, with abutment faces protruding laterally to their direction of movement and hemmed in by steps in the adjacent guideways. The protruding abutment faces are of a greater hardness than the guideways which receive the protruding abutment faces, and thus in the case of high load in the direction of rotation of the fitting, for example in the event of a crash when torque is applied via the back rest to the fitting part to which it is joined, these abutment faces dig into the guideways, thus preventing the respective locking element from moving.

SUMMARY OF SOME ASPECTS OF THE INVENTION

The present invention is based on the object of improving a fitting of the type mentioned above. This and other objects and advantages of the present invention are achieved by a fitting for a vehicle seat, in particular a detent fitting for an automobile seat, having first and second fitting parts which are mounted to be rotatable relative to each other about an axis of rotation, with the second fitting part including an inwardly facing toothing which extends along at least a portion of an arc, at least one locking element positioned between the first and second fitting parts and mounted for movement between longitudinal guide surfaces formed on the first part and so that the locking element is moveable in a radial direction between a radially outward locking position and a radially inward release position, the locking element having on its radial outward side at least one tooth for engaging the toothing of the second part when the locking element is in the locking position, and the locking element further having longitudinal sides which oppose respective ones of the longitudinal guide surfaces, with at least one of the longitudinal sides including a step dividing the respective longitudinal side into a first section and an adjacent second section. The second section is between the step and the tooth. Also, the second section is set back from the first section so as to be further spaced from the associated guide surface.

The locking element thus bears only in the first section against the respective guide surface. In the event of the second fitting part receiving a high torque impact, especially in the event of a crash, the locking element can perform a tilting movement relative to the guiding surfaces, in which case the locking element is able to follow any radial expansion of the second fitting part, and the teeth remain interlocked. Thus the fitting according to the invention can withstand higher loads. The fitting according to the invention can be employed as an adjuster, for example for purposes of adjusting height or inclination, in all vehicle seats comprising adjustable component groups, such as an inclination adjustable back rest or height and/or inclination adjustable seat part.

During the tilting movement of the locking element, the edge of the step adjacent the first section preferably serves as a pivot axis. The position of the step is preferably chosen in such a way that the respective surface normal of the existing tooth flank intersects with the associated longitudinal side of the locking element in the second section. The force transmitted by the toothing of the second fitting part, whose effective curve corresponds to this surface normal, applies torque to the locking element, thereby supporting the tilting movement of the locking element.

In a preferred embodiment, the locking element is doubly supported by an eccentric acting upon the locking element from its radially inward facing side, in order to move it in a radially outward direction. Better support can then be provided for the tilting movement and, in the case of two diagonally opposed locking elements, these receive the load from the second fitting part and transmit it diagonally through the eccentric. In this way, greater forces can be transmitted and hence higher degrees of stability can be achieved.

BRIEF DESCRIPTION OF THE DRAWINGS

The invention is explained in greater detail by means of an exemplary embodiment illustrated in the drawings, in which.

DETAILED DESCRIPTION OF THE EMBODIMENT(S)

Figure 1:
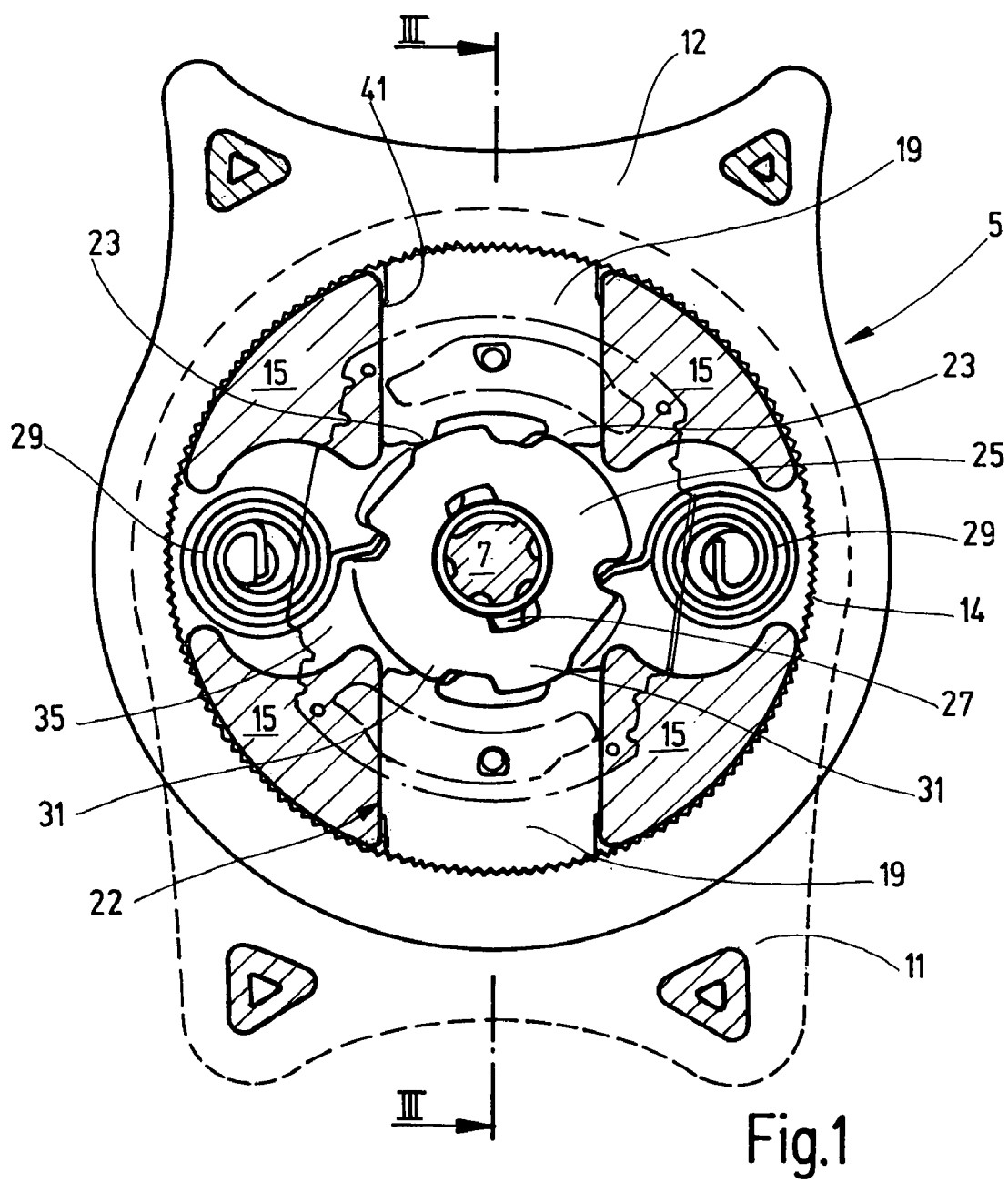
FIG. 1 is a section through the exemplary embodiment of the invention along the line I—I in FIG. 3.
Figure 2:
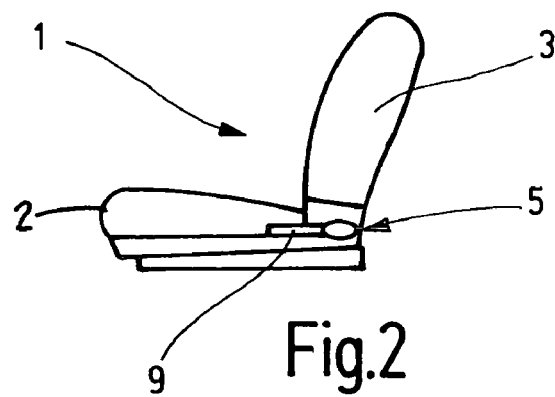
FIG. 2 is a schematic view of a vehicle seat equipped with the exemplary embodiment of the invention.
Figure 3:
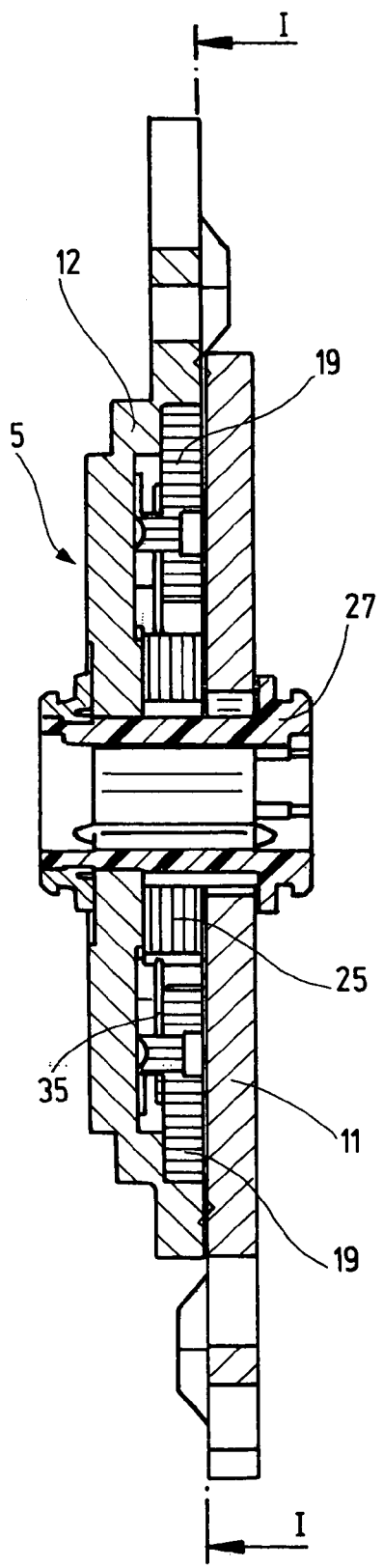
FIG. 3 is a section through the exemplary embodiment along the line III—III in FIG. 1.

For the purpose of adjusting the inclination of its backrest 3 with respect to its seat part 2, a vehicle seat 1 of an automobile comprises on its two sides one fitting 5 each, embodied as a detent fitting. The two fittings 5 are interconnected in gear transmission manner by means of a transmission bar 7. A hand lever 9, which is fixedly mounted to the transmission bar 7, serves to manually activate the fittings 5 concurrently. The indications of direction given below with respect to fitting 5 relate to the cylinder coordinate system defined by the transmission bar 7.

Each fitting 5 comprises a first or lower fitting part 11, and a second or upper fitting part 12, which are held together in the axial direction by retaining plates (not shown). The first fitting part 11 is connected to the seat part 2, and the second fitting part 12 is connected to the backrest 3.

The first part 11 is equipped with four guiding and bearing segments 15, which on the radially outward side form a cylindrical support surface with four sections, for a correspondingly curved, radially inward facing support surface on the second fitting part 12, which is embodied as a circle which is centered about the horizontal axis of rotation defined by the bar 7. This support surface of the second fitting part 12 further comprises a toothing 14. Each of two pairs of guiding and bearing segments 15 forms one guideway, extending radially and defined by parallel guide surfaces 17 (FIG. 4), for a movably attached toothed segment 19.

Each toothed segment 19, also referred to herein as a locking element, comprises a plurality of teeth 21 on a convexly curved side located radially further outward, which can cooperate with the toothing 14 of the second fitting part 12 in order to lock the fitting 5. The two corresponding guiding and bearing segments 15, by means of the guide surfaces 17, guide the longitudinal sides 22, which extend in the direction of movement of the toothed segment 19. A more detailed description of these longitudinal sides 22 will follow later. The radially inward side of toothed segment 19 comprises two convex locking cams 23 at a distance from one another.

In order to push the two toothed segments 19 radially outward (in the locking direction), a disc shaped eccentric 25 is provided, which is mounted on the transmission bar 7 by means of a sleeve shaped driving element 27. Whereas the driving element 27 is fixedly mounted on the transmission bar 7, a backlash in the direction of rotation is provided between the eccentric 25 and the driving element 27, which compensates for torsions in the transmission bar 7, as well as for positional differences between the two fittings 5.

The eccentric 25 is pre-loaded by two spiral springs 29 in one direction of rotation, i.e. the closing direction. On the outer circumference of the eccentric 25, four radially outward projecting eccentric cams 31 are provided with one clamping face each, the latter being eccentrically curved in relation to the transmission bar 7. In the circumferential direction between the eccentric cams 31, the eccentric 25 is sufficiently offset in a radially inward direction to accommodate the locking cams 23.

A driving plate 35, which is fixedly mounted on the eccentric 25 and cooperates in a generally known way with the two toothed segments 19 via slot-and-bolt guideways, serves to retrieve the toothed segments 19 in a radial direction inward, i.e. the unlocking process, which is initiated by rotating the transmission bar 7 by means of the hand lever 9.

The longitudinal sides 22 are not shaped uniformly in all their length. Rather, at a point about one third down their length from the teeth 21, they each comprise a step 41, which divides each of the longitudinal sides 22 into a first section 43, bearing as a contact surface against the guide surface 17, and a second section 45 being set back and being a free surface at a distance from the guide surface 17. The second section 45 extends from the step 41 to the teeth 21, and constitutes about one third of the length of the side 22, whereas the first section 43 extends from the step 41 to the locking cams 23 and constitutes about two thirds of the length of the side. The offset is achieved by cutting the toothed segment 19 in an appropriate way. The extent, i.e. the dimension of the step 41 transversally to the lengthwise extension of the toothed segment 19, is only on the order of fractions of a millimeter, with the result that the finer detail of the longitudinal sides 22 is difficult to see in the true-to-scale representation in FIG. 1. For this reason, FIGS. 4 and 5 are not true to scale.

Starting from an unlocked state, in which the two toothed segments 19 are radially located inward, the eccentric 25, by means of pre-loading the springs 29, is rotated in such a way that the eccentric cams 31 first come to bear against the locking cams 23, and then, in the course of further rotation, push the doubly supported toothed segments 19 outward via the locking cams 23. As soon as the toothed segments 19 engage the upper fitting part 12, the respective fitting 5 is locked.

If, in the locked state, high torque is applied to the second fitting part 12, for example in the event of a crash, then via the toothing 14 and the engaging teeth 21, the toothed segments 19 are tilted transversely to their direction of movement towards the guide surface 17, the edge of step 41 adjoining the first section 43 serving as a pivot axis, while on account of the lateral support of the associated locking cam 23 on the eccentric 25, an opposing locking force is built up.

Figure 4:
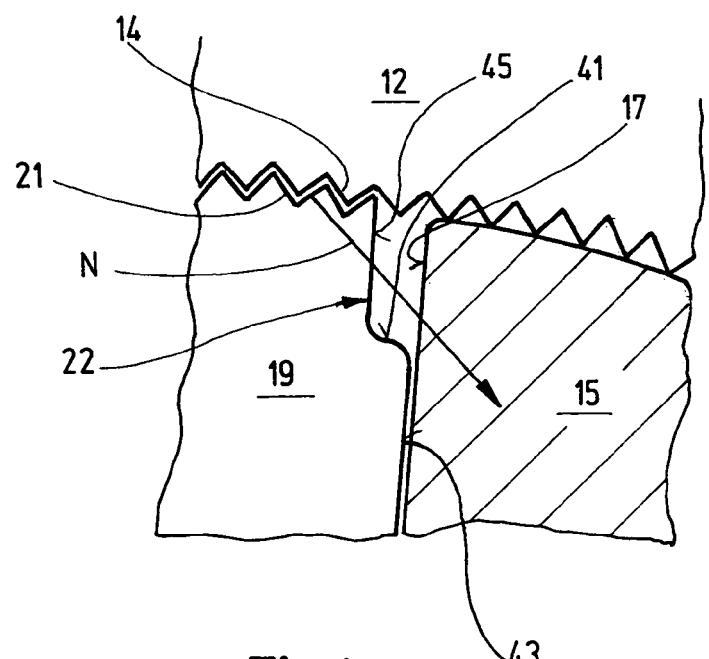
FIG. 4 is a partial view, not true to scale, in the normal, locked condition.
Figure 5:
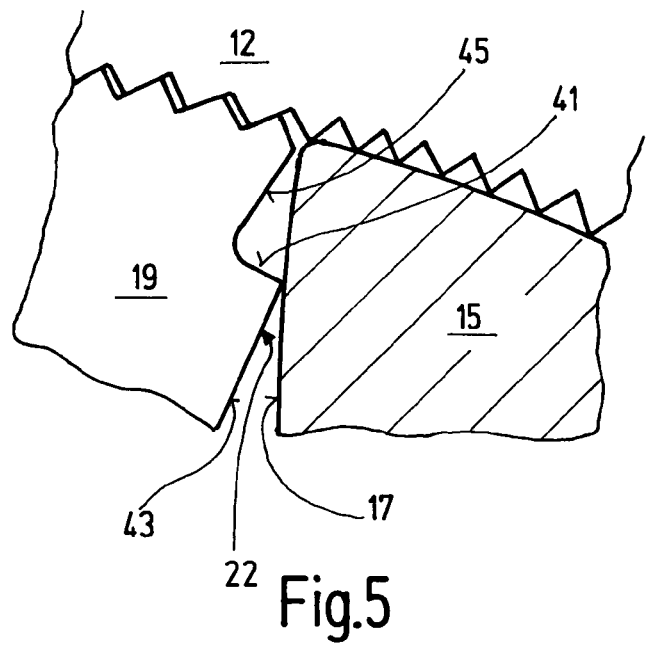
FIG. 5 is a corresponding partial view in the event of a crash, and FIG. 6 schematically illustrates one of the locking elements of the exemplary embodiment in isolation.
Figure 6:
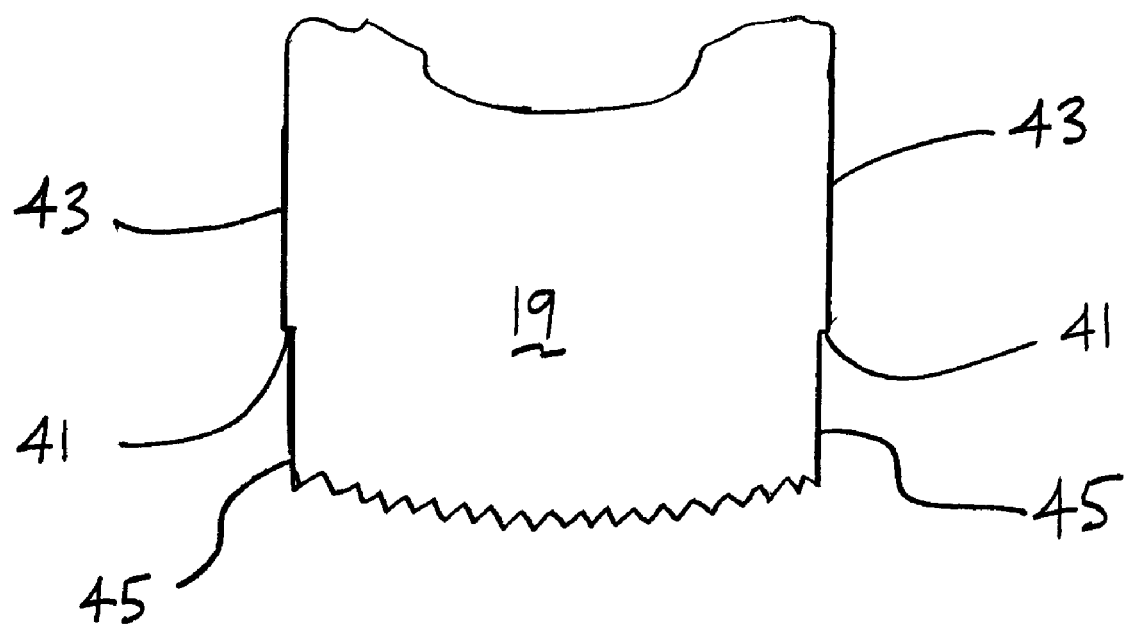

The surface normal N (FIG. 4) of the impacted side of the teeth 21 intersects with the longitudinal side 22 (the one situated radially inward during the tilting movement and comprising the step 41 which serves as the pivot axis) in the second section 45 (above the step 41 as seen in FIG. 4), which means that the tilting movement is reinforced. By contrast, in the case of the known fitting described in the introduction, the surface normal would intersect with the longitudinal side below the step, which means that a moment would be exerted against the tilting movement.

In the case of a high torque load burden being put on the fitting 5, the second fitting part 12 expands radially on account of material expansion, which causes the diameter of the toothing 14 to expand. Because, on the one hand, the toothed segment 19 executes a tilting movement and, on the other hand, the locking cam 23 is resting on the eccentric cam 31, thereby holding the toothed segment 19 in the locked position and slaving it, the radial distance of the teeth 21 of the toothed segment 19 increases in relation to the median axis of the transmission bar 7, i.e. relative to the center of fitting 5. Thanks to the solution introduced by the invention, the teeth 21 follow the expansion of the toothing 14 more closely, thereby maintaining the engagement of the teeth.

What is claimed is:

1. A fitting for pivotally interconnecting the seat part and the backrest of a vehicle seat, the fitting comprising:

first and second fitting parts which are mounted to be rotatable relative to each other about an axis of rotation, and with the second fitting part including an inwardly facing toothing which extends along at least a portion of an arc;

only two locking elements positioned between the first and second fitting parts and mounted for movement between respective longitudinal guide surfaces formed on the first fitting part and so that each of the locking elements is moveable in a radial direction between a radially outward locking position and a radially inward release position, each of the locking elements having on its radial outward side at least one tooth for engaging the toothing of the second fitting part when the locking element is in the locking position, and for each locking element of the two locking elements (a) the locking element further includes
(1) longitudinal sides which oppose respective ones of the longitudinal guide surfaces,
(2) a radially inward side, with the inward side being located radially inward of the locking elements outward side,
(3) two locking cams which are arranged on, and spaced apart from one another along, the inward side of the locking element so that (i) one of the locking cams is proximate one of the longitudinal sides of the locking element, and (ii) the other of the locking cams is proximate the other of the longitudinal sides of the locking element, and (b) at least one of the longitudinal sides includes a step dividing the respective longitudinal side into a first section and an adjacent second section which is between the step and the locking element's tooth, wherein the second section is set back from the first section so as to be further spaced from the associated guide surface, and the step's dimension that extends from the first section to the second section is on the order of fractions of a millimeter, and wherein both the first section and the second section extend in the direction in which the locking element moves between the radially outward locking position and the radially inward release position; and an eccentric mounted for rotating relative to the fitting parts so that the eccentric engages the locking cams and thereby moves the locking elements into the respective locking positions, wherein while the eccentric engages the locking cams and the locking elements are respectively in the locking positions;

(a) there are substantially only two areas of engagement between the eccentric and a first locking element of the two locking elements, with the two areas of engagement between the eccentric and the first locking element being spaced apart from one another and consisting essentially of (1) a first area of engagement which is between the eccentric and a first locking cam of the locking cams of the first locking element, and (2) a second area of engagement which is between the eccentric and a second locking cam of the locking cams of the first locking element, and (b) there are substantially only two areas of engagement between the eccentric and the second locking element, with the two areas of engagement between the eccentric and the second locking element being spaced apart from one another and consisting essentially of:

(1) a third area of engagement which is between the eccentric and a first locking cam of the locking cams of the second locking element, and (2) a fourth area of engagement which is between the eccentric and a second locking cam of the locking cams of the second locking element.

2. The fitting according to claim 1, wherein for each locking element of the two locking elements: there is a predetermined distance between the longitudinal guide surfaces that guide the movement of the locking element, there is a predetermined distance between the longitudinal sides of the locking element, there is a predetermined relationship between the distance between the longitudinal guide surfaces and the distance between the longitudinal sides of the locking element, and the step is positioned such that in the event of high torque impact on the second fitting part, the locking element performs a tilting movement relative to the guide surfaces that guide the movement of the locking element.

3. The fitting according to claim 2, wherein for each locking element of the two locking elements: the step includes an edge means that is located adjacent the first section and is positioned for serving as a pivot axis during the tilting movement.

4. The fitting according to claim 3, wherein for each locking element of the two locking elements: during the tilting movement, the tooth on the locking element follows the toothing on the second fitting part as it moves or widens radially.

5. The fitting according to claim 3, wherein for each locking element of the two locking elements: an imaginary straight line that extends normal to the tooth's side intersects with the longitudinal side in the second section.

6. The fitting according to claim 2, wherein for each locking element of the two locking elements: during the tilting movement, the tooth on the locking element follows the toothing on the second fitting part as it moves or widens radially.

7. The fitting according to claim 2, wherein for each locking element of the two locking elements: an imaginary straight line that extends normal to the tooth's side intersects with the longitudinal side in the second section.

8. The fitting according to claim 2, wherein the two locking elements are diagonally opposite each other so that in the event of torque being applied on the second fitting part, load borne by the two locking elements is transmitted diagonally through the eccentric.

9. The fitting according to claim 1, wherein the two locking elements are diagonally opposite each other so that in the event of torque being applied on the second fitting part, load borne by the two locking elements is transmitted diagonally through the eccentric.

10. The fitting according to claim 1 in combination with the vehicle seat, wherein the fitting is operative for adjusting the backrestt's inclination.

11. The combination according to claim 10, wherein the fitting further comprises at least one member for resiliently biasing the eccentric to rotate in a direction which causes the locking member to move toward said locking position.

12. The combination according to claim 11 further comprising a lever arm connected to the eccentric for manually rotating the eccentric and thereby moving the locking element between the locking and release positions.

13. The fitting according to claim 1, wherein for each locking element of the two locking elements: the second section of the longitudinal side of the locking element extends for about one third of the length of the longitudinal side.

14. The fitting according to claim 1, wherein:

a distance between the longitudinal guide surfaces that guide the movement of the first locking element is at least as large as a distance between (a) a portion of the first area of engagement that is farthest from the second area of engagement, and (b) a portion of the second area of engagement that is farthest from the first area of engagement;

the distance between the portions of the first and second areas of engagement and the distance between the longitudinal guide surfaces that guide the movement of the first locking element extend in a common direction;

a distance between the longitudinal guide surfaces that guide the movement of the second locking element is at least as large as a distance between (a) a portion of the third area of engagement that is farthest from the fourth area of engagement, and (b) a portion of the fourth area of engagement that is farthest from the third area of engagement; and the distance between the portions of the third and fourth areas of engagement and the distance between the longitudinal guide surfaces that guide the movement of the second locking element extend in a common direction.

15. The fitting according to claim 1, wherein:
the eccentric includes a first eccentric cam, a second eccentric cam, a third eccentric cam and a fourth eccentric cam,
the first area of engagement is between the first eccentric cam and the first locking cam of the first locking element,
the second area of engagement is between the second eccentric cam and the second locking cam of the first locking element,
the third area of engagement is between the third eccentric cam and the first locking cam of the second locking element, and
the fourth area of engagement is between the fourth eccentric cam and the second locking cam of the second locking element.

16. The fitting according to claim 1, wherein for each locking element of the two locking elements: the step is in a predetermined position, there is a predetermined distance between the longitudinal guide surfaces that guide the movement of the locking element, there is a predetermined distance between the longitudinal sides of the locking element, and there is a predetermined relationship between the distance between the longitudinal guide surfaces and the distance between the longitudinal sides of the locking element so that, while the locking element is in the radially outward locking position and a predetermined torque is applied to the second fitting part
 (a) the step's edge that is located adjacent the first section is a fulcrum and
 (b) the locking element is tilted with respect to the longitudinal guide surfaces.

17. The fitting according to claim 16, wherein for each locking element of the two locking elements: the second section of the longitudinal side of the locking element extends for about one third of the length of the longitudinal side.

18. A fitting for pivotally interconnecting the seat part and the backrest of a vehicle seat, the fitting comprising:
first and second fitting parts which are mounted to be rotatable relative to each other about an axis of rotation, and with the second fitting part including an inwardly facing toothing which extends along at least a portion of an arc;
only two locking elements positioned between the first and second fitting parts and mounted for movement between respective longitudinal guide surfaces formed on the first fitting part and so that each of the locking elements is moveable in a radial direction between a radially outward locking position and a radially inward release position, each of the locking elements having on its radial outward side at least one tooth for engaging the toothing of the second fitting part when the locking element is in the locking position, wherein
 (a) for each locking element of the two locking elements, the locking element further includes
  (1) longitudinal sides which oppose respective ones of the longitudinal guide surfaces,
  (2) a radially inward side, with the inward side being located radially inward of the locking element's outward side,
  (3) two locking cams which are arranged on, and spaced apart from one another along, the inward side of the locking element so that
   (i) one of the locking cams is proximate one of the longitudinal sides of the locking element, and
   (ii) the other of the locking cams is proximate the other of the longitudinal sides of the locking element, and
 (b) for each longitudinal side of each of the two locking elements, the longitudinal side includes a step dividing the respective longitudinal side into a first section and an adjacent second section which is between the step and the locking element's tooth, wherein the second section is set back from the first section so as to be further spaced from the associated guide surface, and the step's dimension that extends from the first section to the second section is on the order of fractions of a millimeter, and wherein both the first section and the second section extend in the direction in which the locking element moves between the radially outward locking position and the radially inward release position; and
an eccentric mounted for rotating relative to the fitting parts so that eccentric cams of the eccentric respectively engage the locking cams and thereby move the locking elements into the respective locking positions, wherein while the eccentric cams have respectively engaged the locking cams and respectively moved the locking elements to the locking positions
 (a) there are substantially only two areas of engagement between the eccentric and the a first locking element of the two locking elements, with the two areas of engagement between the eccentric and the first locking element being spaced apart from one another and consisting essentially of
  (1) a first area of engagement which is between a first eccentric cam of the eccentric cams and a first locking cam of the locking cams of the first locking element, and
  (2) a second area of engagement which is between a second eccentric cam of the eccentric cams and a second locking cam of the locking cams of the first locking element, and
 (b) there are substantially only two areas of engagement between the eccentric and the second locking element, with the two areas of engagement between the eccentric and the second locking element being spaced apart from one another and consisting essentially of:
  (1) a third area of engagement which is between a third eccentric cam of the eccentric cams and a first locking cam of the locking cams of the second locking element, and
  (2) a fourth area of engagement which is between a fourth eccentric cam of the eccentric cams and a second locking cam of the locking cams of the second locking element.

19. The fitting according to claim 18, wherein:
a distance between the longitudinal guide surfaces that guide the movement of the first locking element is at least as large as a distance between
 (a) a portion of the first area of engagement that is farthest from the second area of engagement, and
 (b) a portion of the second area of engagement that is farthest from the first area of engagement;
the distance between the portions of the first and second areas of engagement and the distance between the longitudinal guide surfaces that guide the movement of the first locking element extend in a common direction;

a distance between the longitudinal guide surfaces that guide the movement of the second locking element is at least as large as a distance between
  (a) a portion of the third area of engagement that is farthest from the fourth area of engagement, and
  (b) a portion of the fourth area of engagement that is farthest from the third area of engagement; and
the distance between the portions of the third and fourth areas of engagement and the distance between the longitudinal guide surfaces that guide the movement of the second locking element extend in a common direction.

20. A fitting for pivotally interconnecting the seat part and the backrest of a vehicle seat, the fitting comprising:
first and second fitting parts which are mounted to be rotatable relative to each other about an axis of rotation, and with the second fitting part including an inwardly facing toothing which extends along at least a portion of an arc;
at least one locking element positioned between the first and second fitting parts and mounted for movement between longitudinal guide surfaces formed on the first fitting part and so that the locking element is moveable in a radial direction between a radially outward locking position and a radially inward release position, the locking element having on its radial outward side at least one tooth for engaging the toothing of the second fitting part when the locking element is in the locking position, and the locking element further having longitudinal sides which oppose respective ones of the longitudinal guide surfaces with at least one of the longitudinal sides including a step dividing the respective longitudinal side into a first section and an adjacent second section which is between the step and the locking element's tooth,
wherein the second section is set back from the first section so as to be further spaced from the associated guide surface, and the step's dimension that extends from the first section to the second section is on the order of fractions of a millimeter, and
wherein the step is in a predetermined position, there is a predetermined distance between the longitudinal guide surfaces that guide the movement of the locking element, there is a predetermined distance between the longitudinal sides of the locking element, and there is a predetermined relationship between the distance between the longitudinal guide surfaces and distance between the longitudinal sides of the locking element so that, while the locking element is in the radially outward locking position and a predetermined torque is applied to the second fitting part
  (a) the step's edge that is located adjacent the first section is a fulcrum and
  (b) the locking element is tilted with respect to the longitudinal guide surfaces.

21. The fitting according to claim 20, wherein the second section of the longitudinal side of the locking element extends for about one third of the length of the longitudinal side.

* * * * *